United States Patent [19]
Lee et al.

[11] Patent Number: 5,101,911
[45] Date of Patent: Apr. 7, 1992

[54] ROTOR TILLER HAVING COUNTER-ROTATING TWIN SHAFTS

[76] Inventors: Kai S. Lee; Esther W. Lee, both of 5235 Raborn Ct., Portage, Mich. 49009

[21] Appl. No.: 672,380

[22] Filed: Mar. 20, 1991

[51] Int. Cl.$^5$ .................. A01B 33/02; A01B 33/16; E01H 5/09
[52] U.S. Cl. ..................... 172/48; 172/113; 172/123; 37/250; 37/260
[58] Field of Search .............. 172/48, 35, 36, 49, 172/42, 57, 60, 100, 112, 113, 114, 116, 118, 119, 121, 123, 52; 37/249, 250, 251, 252, 260, 261

[56] References Cited

U.S. PATENT DOCUMENTS

| | | | |
|---|---|---|---|
| 1,240,542 | 9/1917 | Cassell | 172/49 |
| 2,513,186 | 6/1950 | Leamon | 172/49 |
| 2,612,094 | 11/1952 | Drozinski | 172/48 |
| 3,128,837 | 4/1964 | Arndt | 172/48 |
| 4,402,366 | 9/1983 | Dankel | 172/52 |
| 4,620,599 | 11/1986 | Zinck | 172/49 |

Primary Examiner—Dennis L. Taylor
Assistant Examiner—Spencer Warnick
Attorney, Agent, or Firm—Donald Corneglio

[57] ABSTRACT

A rotor tiller having a counter-rotating twin shaft system and counter-rotating digging means such as tines, paddles, or blades for efficient tilling of soil. In another embodiment, the tines on the twin shafts can be replaced by counter-rotating helical auger blades for removal of loose soil or snow. Furthermore, digging bits of suitable kind and size can be affixed to the helical auger blades for simultaneous digging/tilling and removing of soil, snow. This new design eliminates many problems associated with conventional tillers and increases the utility of the subject tiller.

12 Claims, 19 Drawing Sheets

ROTOR TILLER HAVING COUNTER-ROTATING TWIN SHAFTS

BACKGROUND OF THE INVENTION

The subject invention is directed toward a rotor tiller having a counter-rotating twin shaft system. This new design eliminates many problems associated with conventional tillers and increases the utility of the subject tiller.

Conventional rotor tillers used for tilling soil and cultivating in gardening or agriculture works characteristically have a single shaft with a plurality of tines, usually four, affixed to it. In operation, the engine drives the shaft and its tines to rotate in unison in one direction, either clockwise or counter-clockwise and will till the ground while propelling the rotor tiller forward or backward.

These conventional, single shaft machines will do a good job of tilling previously tilled soil or light sandy soil. On hard soils, or rocky grounds however, conventional rotor tiller of any type becomes less efficient because the force required to till the hard ground exceeds the force exerted on the ground by the weight of the machine. Consequently, the machine will "walk" over the ground and skip spots, resulting in uneven tilling of the ground and also to a very shallow depth.

This problem is partially circumvented by installing a drag bar system or counter-rotating traction wheel which has the net effect of slowing the advance of the machine so that the tines can stay on a given spot longer, allowing deeper penetration of the tines into the soil. However, neither the drag bar system not the counter-rotating wheel by itself produces any useful work other than holding the machine back from advancing too quickly and the problem of uneven and shallow tilling remains, although somewhat diminished.

Secondly, to generate counter-rotating traction, special traction wheels and gear transmission have to be used and frequent switching between transmissions is required. Thirdly, on tilling hard soil, the motion of the tines often overpowered the stopping force of the drag bar or the traction of the counter-rotating wheels; this results in uncontrollable back and forth jerking motions of the machine and uneven tilling of the soil. In order to smooth the advance of the machine on hard soil surfaces, the operator has to pull and shove the machine forwardly and backwardly, causing human fatigue.

Fourthly, soil, especially hard soil dug up by the tines of conventional rotor tiller is in large chunks (held together by roots, grass etc.) that often requires further breaking apart either manually or by running the chunks of soil over and over with the machine in order to achieve a fine consistency. Finally, roots, vines, plastic sheets, cloths, ropes and other fabric like material etc. are often picked up by the blades and winds around the rotating shaft and tines. These tangling mass of non-soil materials can overload the engine and greatly reduce the digging power of the machine.

Besides the problems mentioned above, typically all conventional rotor tillers are designed for one single purpose such as tilling of the ground. Clearly, there is a need for a more efficient machine that is not only devoid of problems associated with the conventional rotor tillers, but is more versatile capable of tilling the ground in the spring and removal of snow in the winter.

SUMMARY OF THE INVENTION

The present invention comprises two counter rotating shafts inside a housing having depending side walls, a rear mounted handle and an engine located at the top. The shafts are rotatably mounted on the side walls transversely thereof relative to the direction of machine travel. One member of the shaft is forwardly mounted and the other, being parallel in position on the same horizontal plane, is rearwardly mounted. Affixed to each shaft are "digging and/or transporting means" which can be tines of conventional design, blades, paddles or other digging apparatus which can be attached to the shafts. In another embodiment a helical auger blade can be affixed to each shaft instead, and a plurality of digging bits can be attached to the helical balde for simultaneous digging and transporting of material being operated on such as soil, gravel or snow. The number of "digging and/or transporting means" such as tines or the lateral length of each helical auger blade is sufficient to cover the entire tilling area inside the machine housing.

A transmission box is located to either side of the machine housing as viewed from the rear (for purposes of explanation the transmission box is located on the left side and is triangular). A short segment of the respective shafts extends through an aperture in the housing wall into the base of the transmission box and terminates thereof in a chain sprocket of identical size. Also extending into the top of the box through another aperture, and generally in parallel to the shafts below, is an engine drive shaft which terminates in a chain sprocket of smaller diameter. The three chain sprockets are drivingly linked together in the box by a drive chain. To create counter rotation of the two shaft members, the drive chain winds circumferentially around the opposite sides of their respective sprockets. Therefore, viewing from the left side of the machine into the box, the chain winds on the teeth around the right, bottom and lower left circumference of the rearwardly mounted shaft sprocket; then, the chain reverses direction by winding around the teeth at the top, left and lower left circumference of the forwardly mounted shaft sprocket; here, a pulley idler is required to hold the chain against the left and lower left side of the forwardly mounted shaft sprocket so that a firm engagement of the chain with the teeth thereof can be maintained at all times. After the chain leaves the pulley idler, it is drivingly engaged with the engine drive shaft sprocket to complete the drive cycle. This way, a clockwise rotation of the engine drive shaft will drive the rearwardly mounted shaft and its two tines to rotate also clockwise, but the forwardly mounted shaft member and its two tines will rotate in the exact opposite direction, counter-clockwise, to create the counter rotating shafts and tines configuration.

Normally, the twin counter rotating shaft members and their respective tines are held together in close apposition by extension springs without actually touching. Their close proximity would have the advantage of breaking up soil into fine consistency. However, the close proximity can also trap rock/hard matter in between the rotating mechanism as the counter rotating shafts and tines move towards each other. This problem can be resolved by permitting the rearwardly mounted shaft and tine member to slide parallel and rearward relative to the fix positioned forwardly mounted shaft and tine. The rearward sliding movement is made possible by rotatably resting each end of the rearwardly mounted shaft on a sliding track in the housing walls. The track allows only horizontal, with no vertical nor lateral movements for the rearwardly mounted shaft and its tines at anytime. If a rock is caught in between the counter rotating tines, the rearwardly mounted shaft will respond by sliding rearward, thus creating space between the two sets of counter rotating tines and to allow the tines to continue to rotate until the rock/hard matter is ejected from between the counter rotating tines. After rocks/hard matter is ejected, the extension springs on either side of the housing pulls the rearwardly mounted shaft and its tines forward along the path defined by the sliding tracks; thus the original close proximity configuration of the counter rotating shaft and tine members is restored.

If the counter rotating tines are of exact size and shape and have a similar degree of rotation, they will dig/till the ground/soil with equal but opposing force; and the forward digging force generated by the tines of the forwardly mounted shaft will be canceled by an equal, rearwardly directed digging force generated by the tines of the rearwardly mounted shaft. The balanced but opposed digging force generated by the counter rotating tines allows the machine to stay stationary while the ground/soil is being dug/tilled continuously beneath the machine. On the other hand, if the machine is tilted forward as by tilting the rearwardly mounted handle upwards, the weight of the machine will be shifted forward allowing the tines of the forwardly mounted shaft to dig deeper into the soil; the excess traction developed by these tines will overcome that of the rearwardly mounted tines, and the machine will move forward instantly. Likewise, if the machine is tilted rearward as by lowering the rearwardly mounted handle, the rearward traction will increase and the machine will move backward instantly. The depth of ground digging and the speed of forward or backward movement can be readily controlled by the amount of upward or downward tilt of the handle. If a constant advance of the machine in either direction is desired, the operator can adjust the handle height using a supporting pole that moves along on the ground on a wheel.

To make this invention more versatile, tines on the counter rotating shafts can be replaced by helical auger blades that run angularly along the entire axis of the shaft. The juxtapositioned helical blades facing each other have opposite helix angles and alternating turns. As the shafts counter rotate, the opposing blades will move towards each other and also towards one side of the machine; this will channel loose soil or granular material towards the space between the opposing blades and then to one side of the machine whereby the loose material is collected in a chute and is discharged to the outside by a blower mechanism. The blower is driven to rotate inside the chute by either shaft through a belt-pulley system. The helix angle and the direction of rotation of the blade can be configured to channel loose granular material to the center of machine to be discharged thereof by a similar chute and blower mechanism.

Further, on the helical blades, a plurality of tilling bits of suitable shape and size can be affixed to pre-determined positions such that the tilling bits reach out of the outer perimeter of the blade. As the blades counter rotate, the tilling bits will dig/till the soil and the loose soil will be channelled at once by the rotating blades to the blower to be discharged outside the machine.

The advantages offered by this invention are 1) stationary but continuous digging action; 2) self-propelled, forward digging action without the use of transmissions; 3) self-propelled, rearward digging action without the use of transmissions; 4) instant machine advance or retreat without the use of transmissions, best suited for tight corners and small plots; 5) little effort is required for deep and even ground tilling; 6) Simultaneous digging and removal of soil; and 7) removal of snow.

BRIEF DESCRIPTION OF THE DRAWINGS

FIG. 1 is a 60 degree angle, perspective left side view of the machine with cut-outs showing the rotating twin shafts and tines, the sliding tracks. Also shown is the transmission box opened, revealing a drive chain and sprockets engaged properly for counter-rotation.

FIG. 2 is shown with the engine, the machine and transmission housing removed, revealing the components interconnected to function as a complete drive unit.

FIG. 3 shows the rearwardly mounted shaft properly mounted on the slide tracks and their relationship to the forwardly fix mounted shaft.

DETAILED DESCRIPTION OF THE INVENTION

I. Counter-rotating Twin Shafts with Tines

Figure 1A:
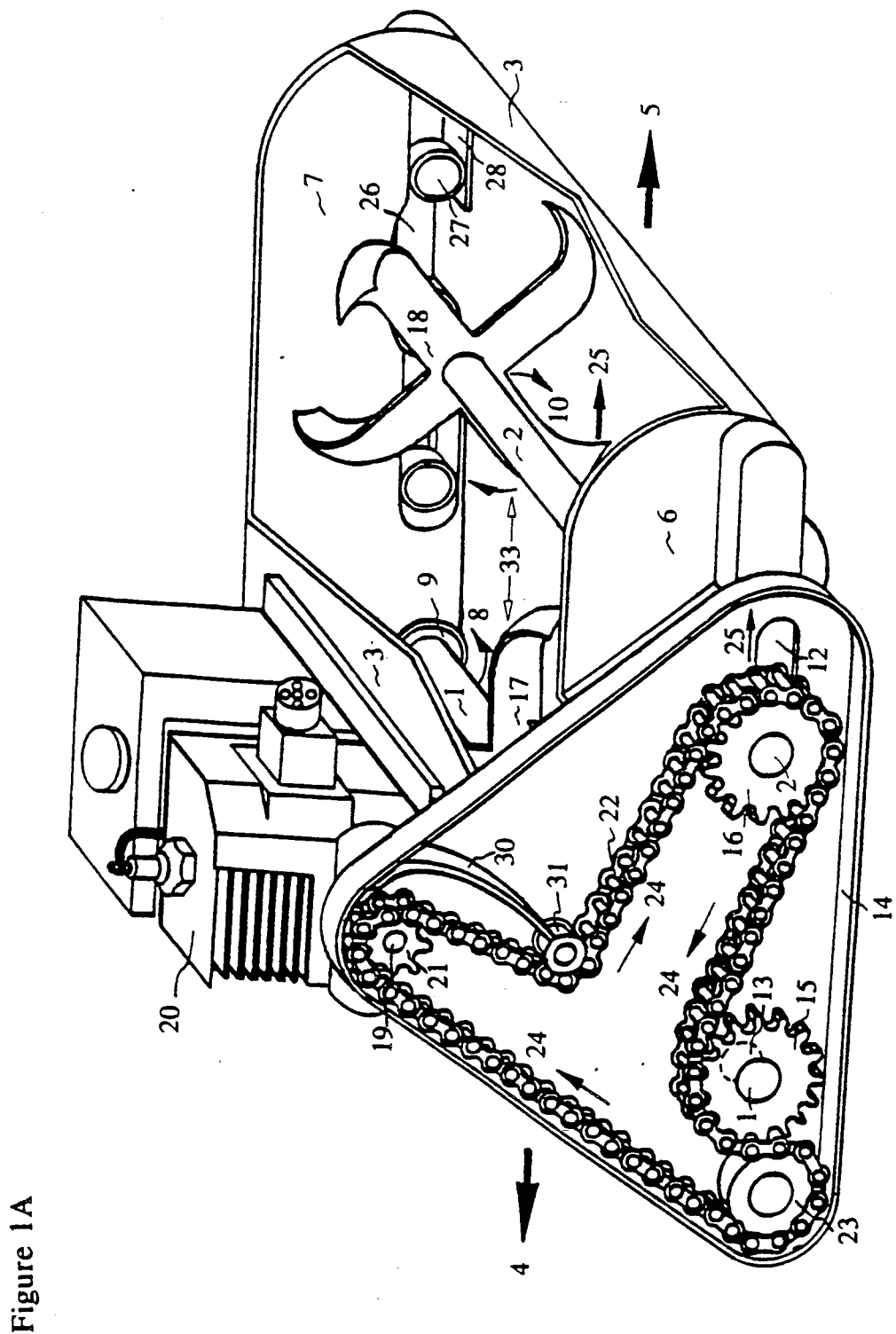
FIG. 1A and 1B differs only in showing respectively, the forward and rearward sliding positions of the rearwardly mounted shaft.
Figure 1B:
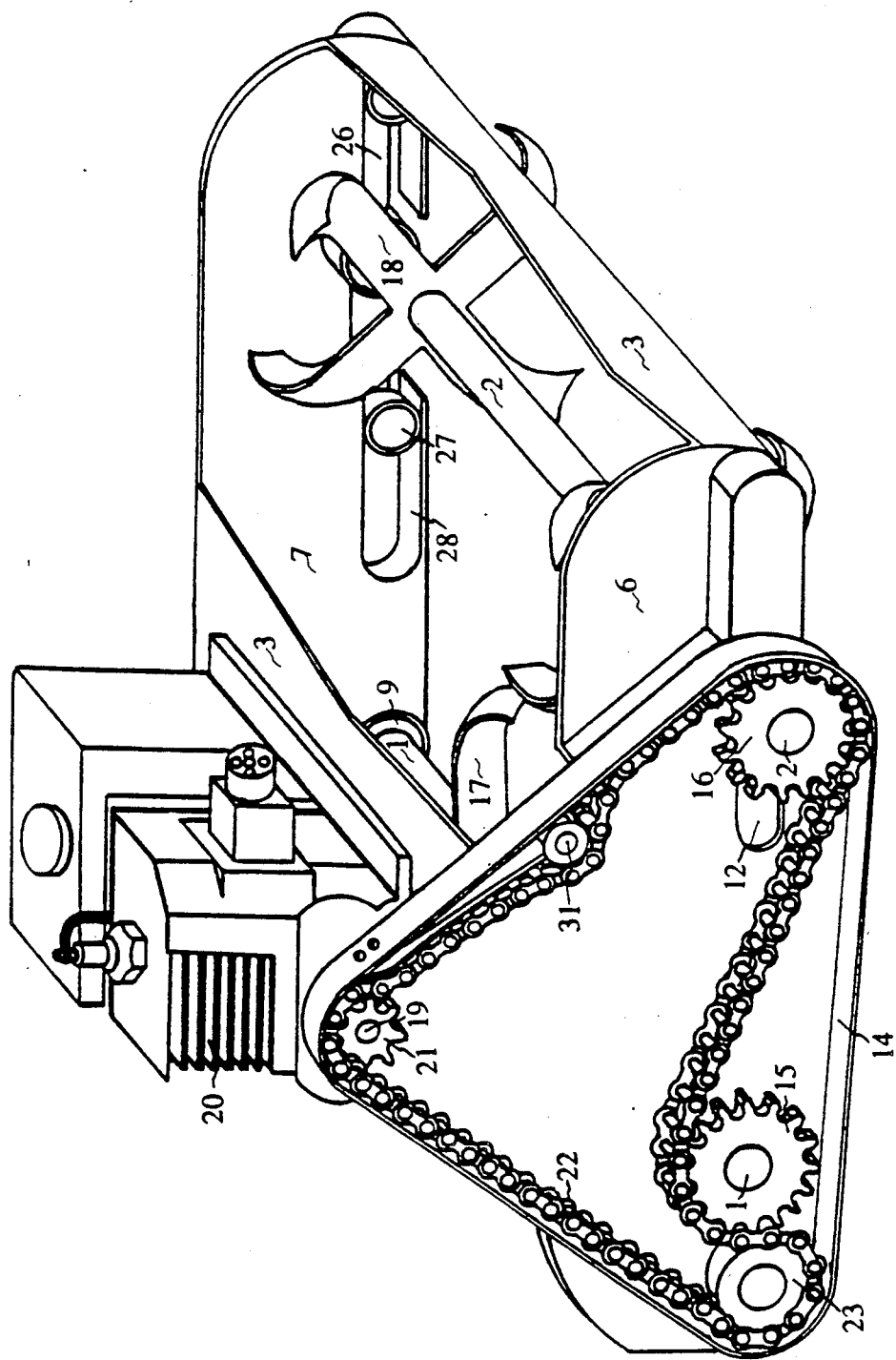

FIGS. 1 through 4 show the twin shafts 1, 2, being mounted transversely thereof inside the housing 3 relative to the forward 4 and rearward 5 direction of machine travel; shaft 1 is mounted forwardly and shaft 2, positioned parallel lengthwise, is mounted rearwardly on the walls 6,7 on opposite sides of the housing 3.

Shaft 1 rotates 8 freely on a ball bearing 9 one in each side wall 6 or 7 and shaft 2 rotates 10 freely on a similar ball bearing 11 in the side walls 6,7. As viewed from the rearward direction 5, the shafts 2,1 extend through an aperture 12,13 respectively in the side wall 6 into the bottom portion of a gear-chain transmission box 14 having a triangular shape; aperture 12 is elongated horizontally. Inside the transmission box 14, shaft 1 and 2 terminate respectively in chain sprockets 15 and 16, both having a similar diameter; rotation of sprocket 15,16 causes an exact rotation of their respective shaft 1 and 2 and the tines 17,18 affixed thereupon. At the top of said transmission box 14 and generally in parallel to shafts 1, 2 below is the drive shaft 19 of an engine 20. The drive shaft 19 terminates in a smaller chain sprocket 21. All chain sprockets 15,16,21 are linked in the box 14 by a drive chain 22. To create counter rotational movement between sprockets 15 and 16, drive chain 22 winds circumferentially around the opposite sides of sprocket members 15,16. Therefore, from side wall 6 on the left looking into the transmission box 14, the drive chain 22 winds around the teeth of sprocket 16 at the top, right, bottom and lower left circumference; then, it reverses its direction by winding around the teeth on the opposite side of sprocket 15 at its top, left and lower left circumference; here, in order to keep the chain 22 firmly engaged with sprocket 15 at all times, a pulley idler 23 is used to push the chain 22 against the left and lower left circumference of sprocket 15; the pulley idler 23 is rotatably mounted on the side wall of transmission box 14. After chain 22 leaves the pulley idler 23, it is engaged with the sprocket 21 on the engine drive shaft 19 for completion of a drive cycle 24. This way, a clockwise rotation of the engine drive shaft 19 will drive the rearwardly mounted shaft 2 and its two tines 18 to rotate clockwise 10, but forwardly mounted shaft 1 and its two tines 17 to rotate in the exact opposite direction, counter-clockwise 8 causing the tines 17 to move towards tine 18, and vice versa; likewise, if the engine drive shaft 19 rotates counter-clockwise, the tines 17 and 18 will move away from each other; and this, is the basis for the instant invention. Obviously, there are other ways to create counter rotation as by a direct engagement of the gear teeth with two neighboring gears. However, the chain and sprocket arrangement described here represents one of the simplest, most reliable and economical way to creating counter rotation of two opposing shaft members.

The tines 17,18 are removably fixed on their respective shaft using nuts and bolts and their positions on the shafts 1, 2 cover the entire lateral width of ground inside the machine housing 3; for example, the two rear tines 18 can be placed wide apart, one near each end of shaft 2 closest to the housing walls 6,7; and the forward tines 17 can be positioned closer together, near the mid-section of shaft 1. Further, equal and adequate lateral spacing are provided for all tines so that they would not touch each other or any parts of the machine except the ground at all times. The shafts 1,2 and their bearings 9,11 are removably mounted in the housing walls 6,7 and the shafts 1,2 can be further removed from their bearing 9,11 by removing a washer and lock-pin for servicing or replacement of the tines with helical auger blades.

Figure 2A:
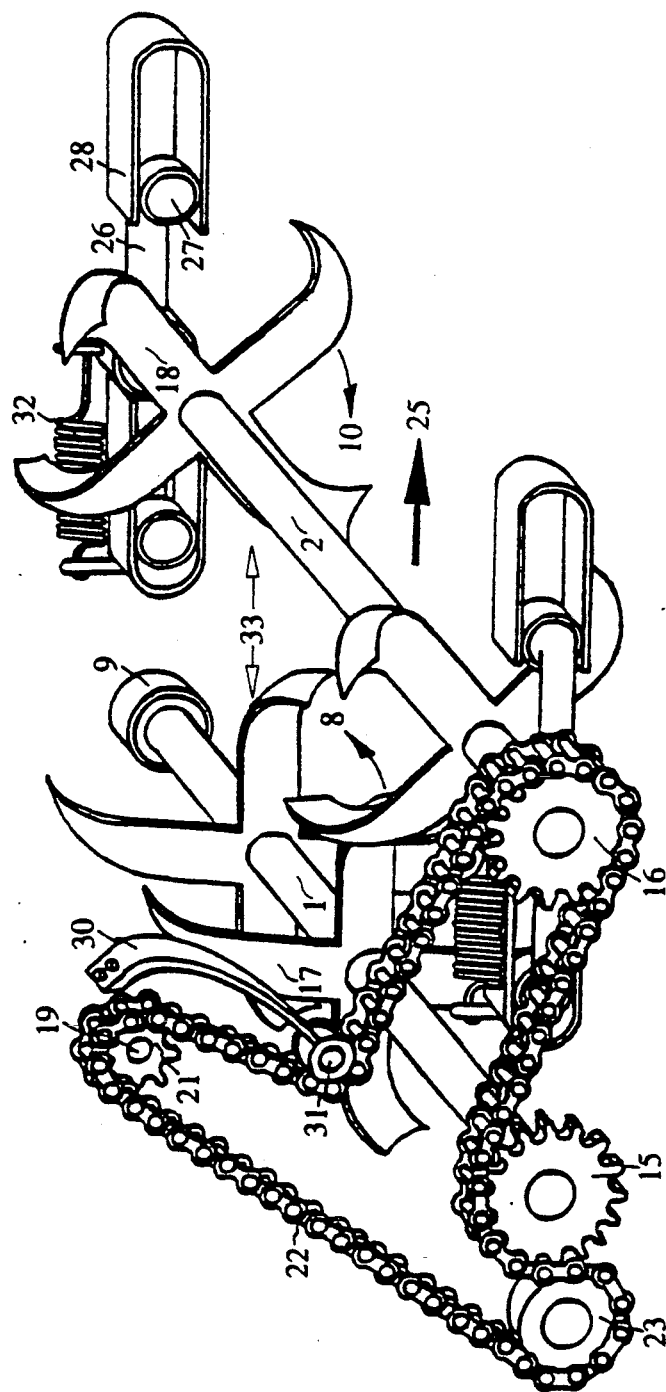
FIG. 2A and 2B differs only in showing respectively, the forward and rearward sliding positions of the rearwardly mounted shaft.
Figure 2B:
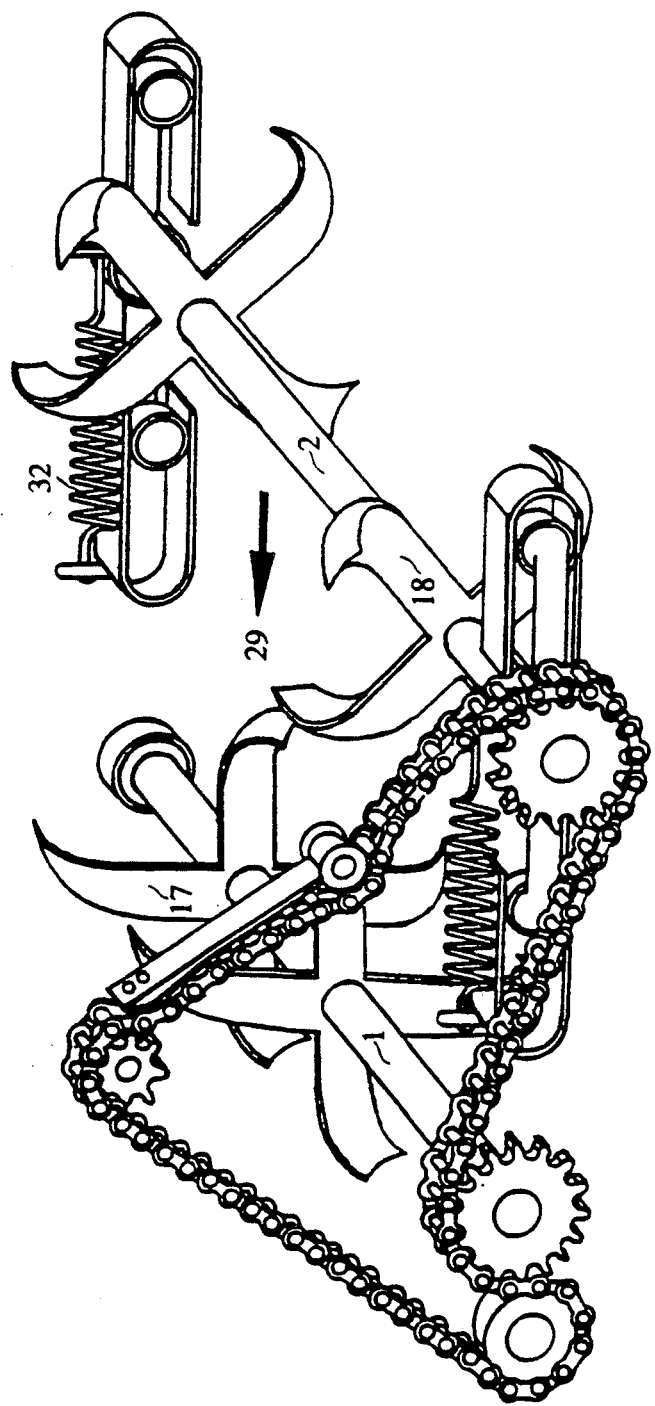
Figure 3A:
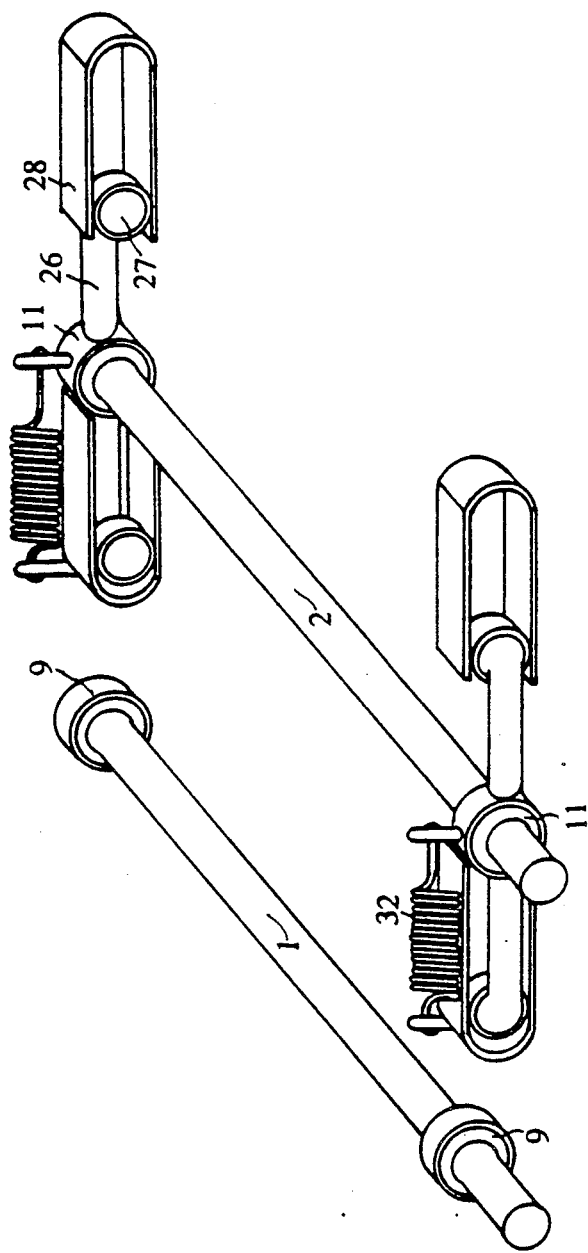
FIG. 3A and 3B differs only in showing respectively, the forward and rearward sliding positions of the rearwardly mounted shaft.
Figure 3B:
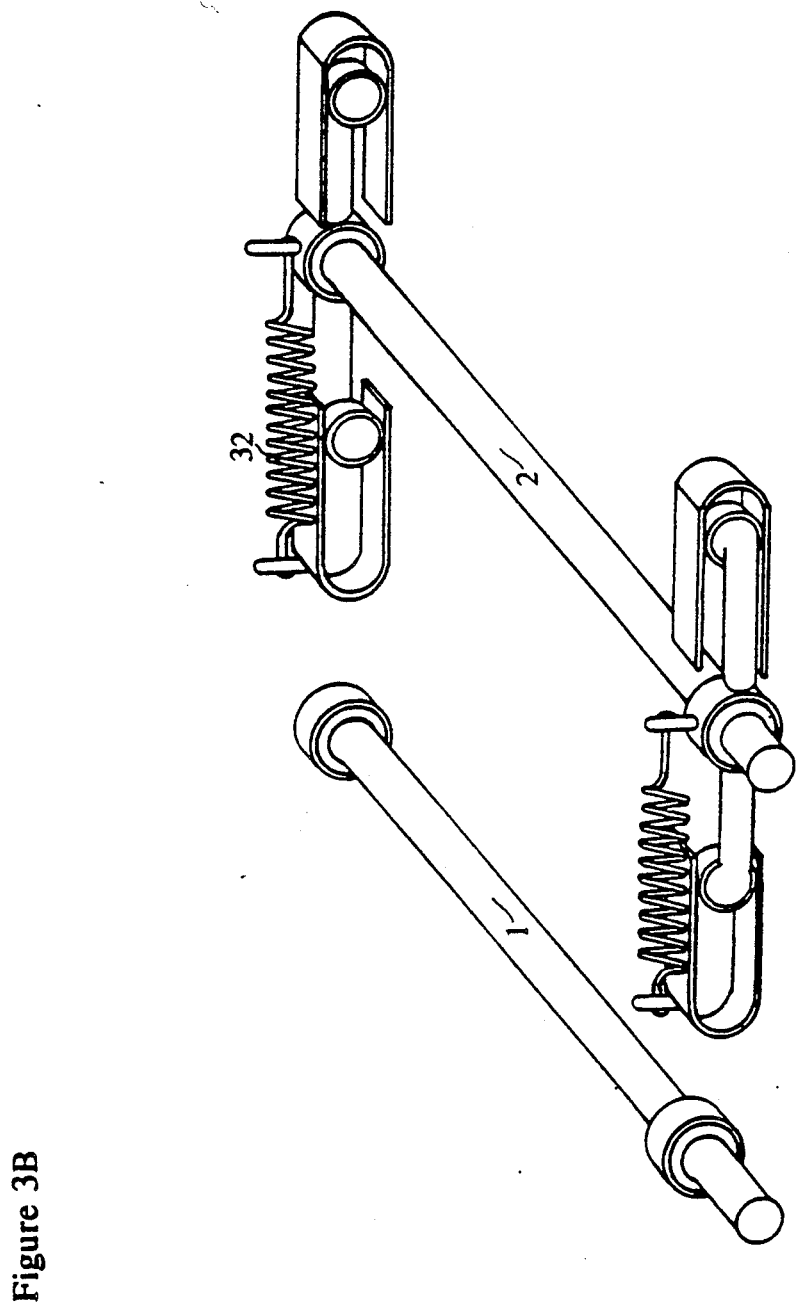
Figure 4:
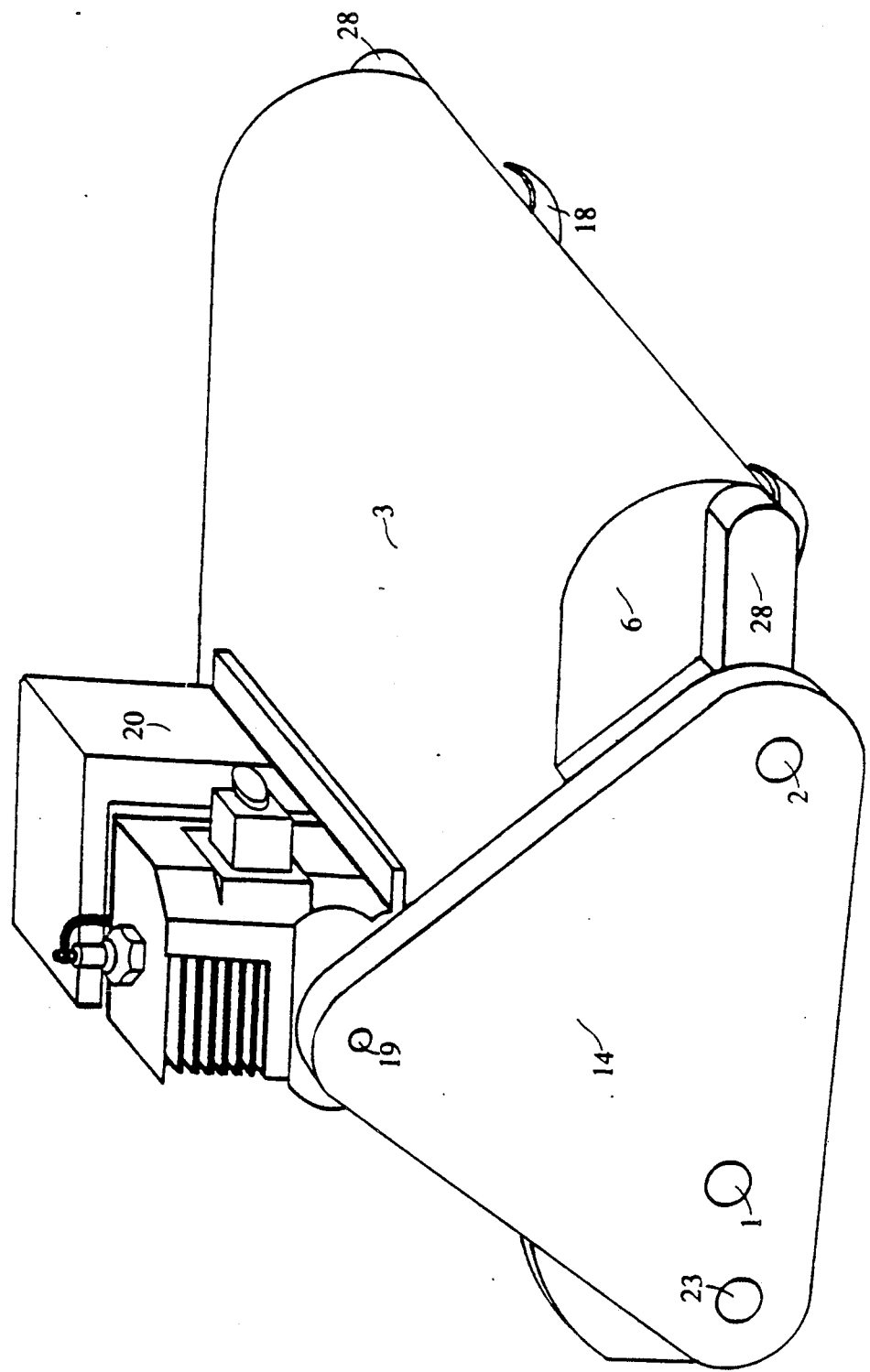
FIG. 4 is an overall outside view of the machine.

Normally, as shown in FIG. 1A, 2A, 3A, the twin counter rotating shaft members 1,2 and their respective tines 17,18 are held in close juxtaposition with each other without touching while rotating. This close configuration have the advantage of breaking up the dug up soil into fine consistency, but the chance of trapping rock/hard matter in between the counter rotating tines 17,18 also increases. This problem can be resolved by permitting the rearwardly mounted shaft 2, its tines 18 and its sprocket member 16 to slide rearward 25 relative to the fix positioned counterparts, 1,17 and 15. The rearward sliding movement 25 can be achieved by mounting the ball bearing 11 on a sliding mechanism. For example, each ball bearing 11 can rest on the mid section of supporting arm 26 positioned horizontally and perpendicularly to the long axis of shaft 2; either end of arm 26 terminates in a ball bearing roller 27 which slides horizontally inside a sliding track 28 located in the side walls 6,7. Since roller 27, arm 26, ball bearing 11 and shaft 2 are tightly interconnected forming one slidable unit, they are collectively referred to hereafter as the slidable unit. The sliding track 28 is constructed to allow only horizontal and a juxtaposition sliding of shaft 2 relative to the position of shaft 1; no lateral and vertical movements of either shafts 1 or 2 are allowed at any time. Inside the transmission box, excess chain length 22 is provided to allow sprocket 16 to slide along aperture 12 freely with the slidable unit. To properly tension the chain 22 of excess length so that a firm engagement of chain 22 with all sprockets 15,16,21 can be maintained at all times, a tensioner 30,31 can be used; the tensioner can be of any type such as in the form of a flat spring 30 whose one end is affixed to the wall of transmission box 14 facing the lower right side of sprockets 21 while its other end terminates in a roller 31. The tensioner 30,31 exerts a constant force on chain 22 to keep it fully stretched and firmly engaged with the teeth of chain sprockets 15,16,21 at all times.

Therefore, with this or similar arrangements, shaft 2, while rotating, can also slide either forwardly 29 or rearwardly 25 for a distance as defined by sliding track 28. The components of the slidable unit can be comprised of any suitable parts and means as to provide maximal ease for shaft 2 to rotate and slide simultaneously in a manner just described. For example, each bearing 11 carrying the rearwardly mounted shaft 2 can be placed directly in the sliding track 28 without use of the arms 26 and roller 27. To prevent dust and debris from entering the sliding track 28 and the rollers 27, a rubber diaphragm or other appropriate sealing means can be used to cover these components.

On tilling of light sandy soil or previous tilled soil, the slidable unit is held to its forward most position on the sliding tracks 28 by an extension spring 32 with adjustable force; one end of spring 32 is anchored on either the side walls 6,7 or the sliding track 28 and its other end is achored on the supporting arm 26 or a stationary spot on ball bearing 11. If tines 18 dig into a hard ground or rock that generate a resistance force greater than the pull of springs 32, the spring will extend allowing the slidable unit slide rearwardly 25 along track 28; as new space 33 is created in between the juxtapositioned shafts 1 and 2, the tines 17,18 can continue to rotate to eventually loosen the hard soil or eject the rock from between the counter rotating tines 17,18. Normally, for tilling of ordinary or hard rocky grounds, enough rearward travel distance for the slidable unit and its tines 18 is allowed by sliding track 28 to prevent a lock up of the tines 17,18 by rock/hard matter caught in between the counter rotating mechanism. Upon loosening of the hard ground or ejection of rocks caught between tines 17,18, the slidable unit will automatically slide forward 29 along track 28 under the pull of the extension springs 32 to resume its original close juxtaposition with shaft 1. During transitional back 25 and forth 29 sliding movements, free rotation of shaft 1 and 2 and their respective tines 17,18 will be maintained.

Figure 5A:
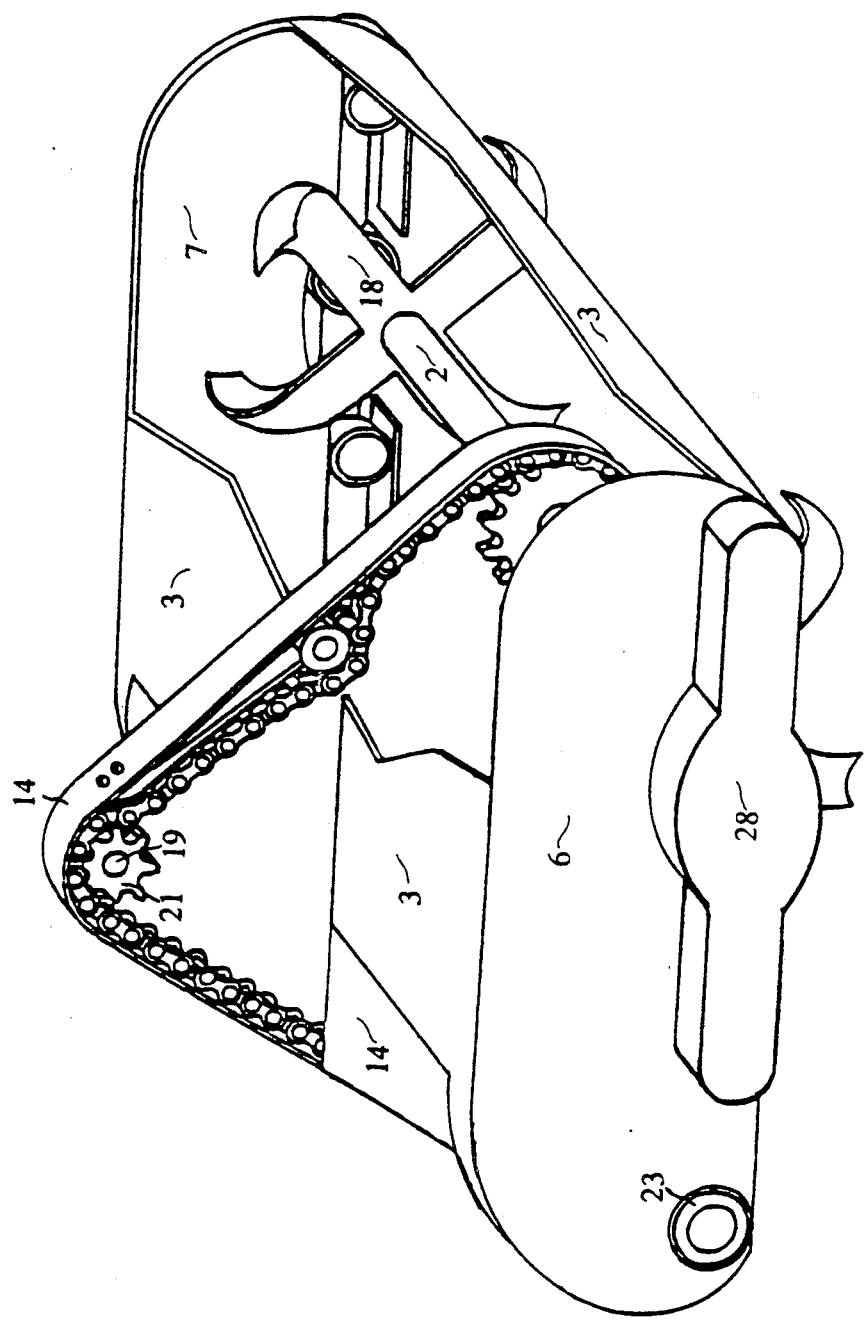
FIG. 5A, 5B, 5C are respective repeats of FIG. 1B, 2B and 4, differing only by showing that the transmission is centrally located.
Figure 5B:
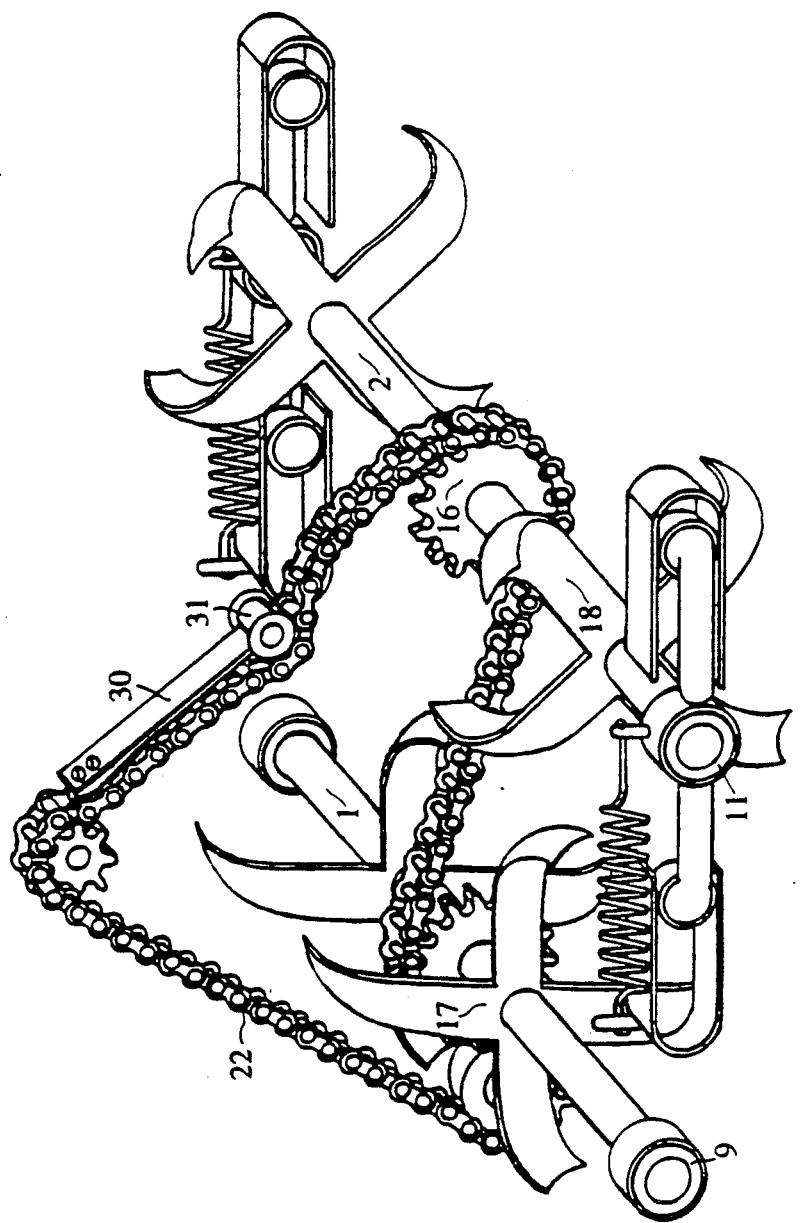
Figure 5C:
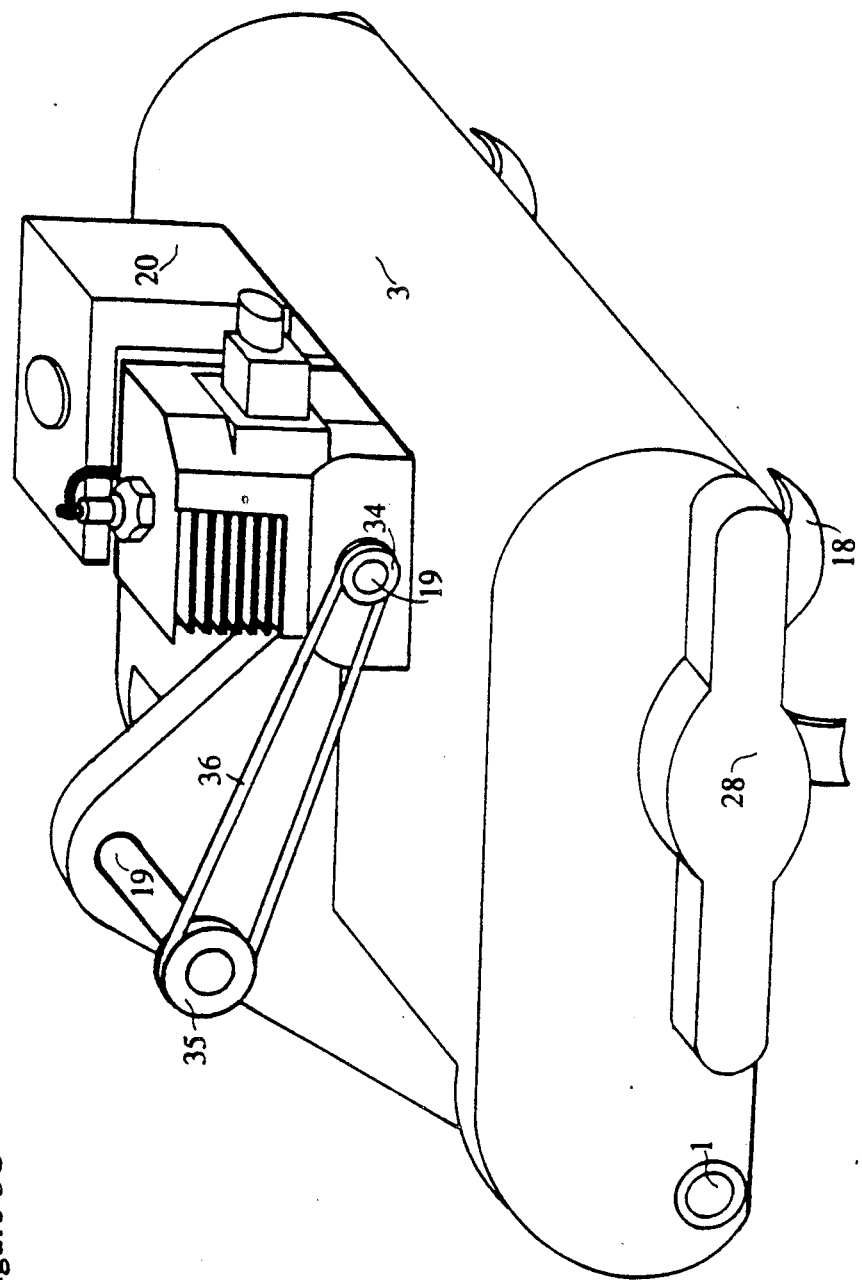

The chain and gear transmission box 14 can be located either on the left or right side of the machine. Similarly, the box 14 and its contents of chain 22 and sprockets 15, 16, 21 can be arranged on the mid-section of shafts 1, 2 as shown in FIGS. 5A, 5B, 5C. In this configuration, the engine 20 can be mounted at the rear top, midsection of the machine housing 3; the engine drive shaft 19 is shown to be connected through a pulley 34,35 and belt 36 system. This mid-section transmission box 14 configuration does not alter counter rotational principle and its unique functions in any way except to provide an example among a variety of different configurations that the instant invention can exist.

Figure 6:
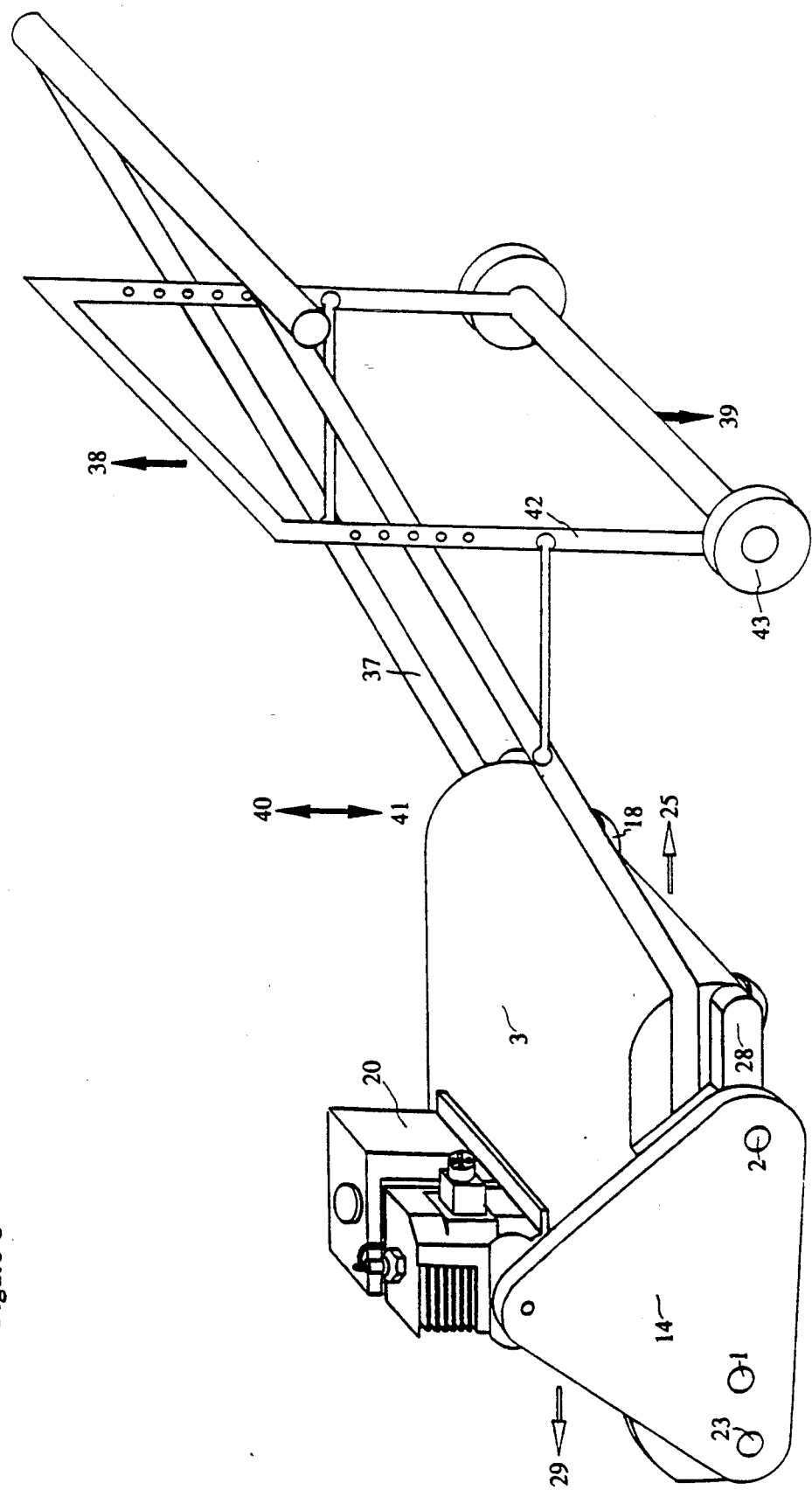
FIG. 6 is the outside view of the machine with handle and handle height adjuster properly installed.

FIG. 6 is shown with the handle 37 installed. Because of the unique counter rotational tines 17, 18, the handle 37, besides for guiding the machine, performs three important functions normally requiring complex transmissions: a. stationary tilling; b. self propel forward or backward tilling; c. control on speed of machine travel. All three function can be readily obtained and interconverted by simply adjusting the height of handle 37. The stationary tilling is one of the most unique and useful functions of this invention; it is made possible by the counter rotating tines 17, 18 having a similar size and shape and an equal degree of rotation. As the machine is levelled with the ground by levelling of handle 37, the forward digging force generated by the tines 17 on shaft 1 will be canceled by an equal, rearwardly directed digging force generated by tines 18 of shaft 2. The balanced but opposed digging force generated by the counter rotating tines 17,18 allows the machine to stay stationary while the ground/soil is being dug continuously beneath the machine. On the other hand, if the rear end of the machine is tilted upwards 40 by tilting handle 37 upwards 38, the weight of the machine will be shifted forward allowing the tines 17 of shaft 1 to dig deeper into the soil; the excess traction developed by tines 17 will overcome that of the rearwardly mounted tines 18, and the machine will move forward 29 instantly. Likewise, if the rear end of the machine is lowered 41 by lowering 39 the handle 37, rearward traction will increase and the machine will move backward 25 instantly. The depth of ground tilling and the speed of forward 29 or backward 25 movements can be readily controlled by the amount of upward 38 or downward 39 tilt of handle 37. If a constant advance of the machine in either direction is desired, the handle height can be adjusted by using a supporting leg 42 that glides along the ground on a wheels 43.

II. Counter-rotating Twin Shafts with Helical Auger Blades

In another embodiment, the tines 17, 18 can be conveniently replaced by a helical auger blade system for added functions.

Figure 7:
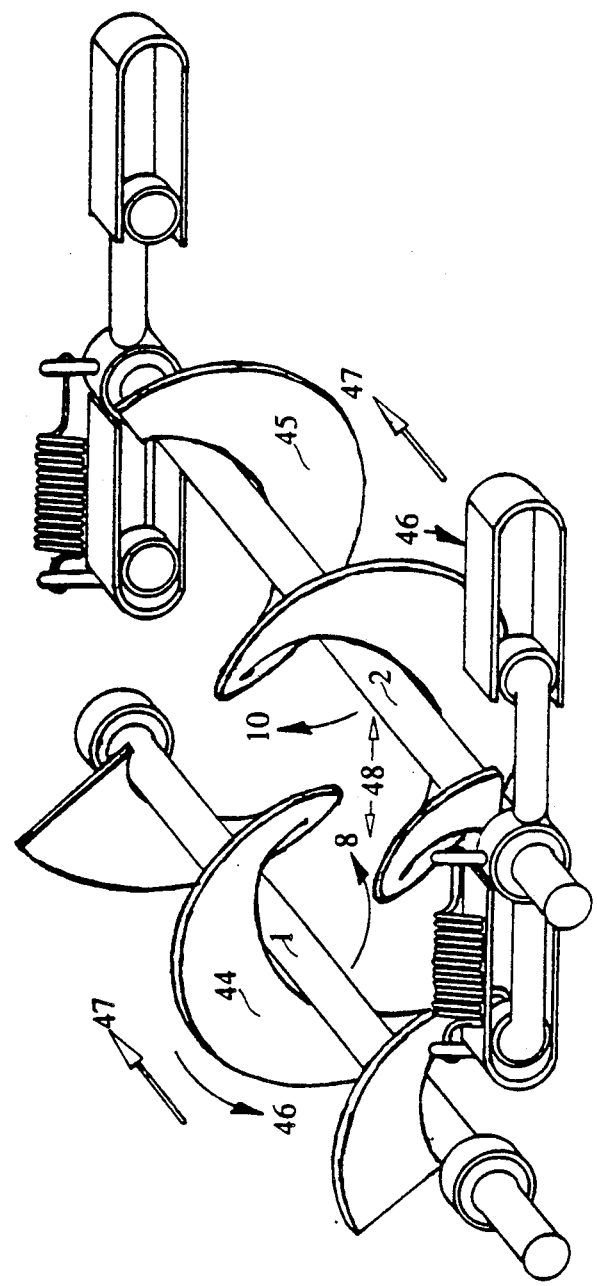
FIG. 7 shows the tines of FIG. 2 are replaced by a pair helical auger blade, one on each shaft.

FIGS. 7 through 10 illustrate a helical auger blades system that can perform both tilling and removal of soil material simultaneously from underneath the machine housing 3. In this configuration, the tines 17,18 on each shaft 1,2 are replaced by a helical auger blade 44, 45 refered hereafter as blades 44,45. These blades 44,45 run angularly about the axis along the entire length of each shaft 1 or 2 inside the machine housing (FIG. 7). Each shaft can have a single blade or a plurality of blades affixed to it. For the purpose of description, a single, continuous blade 44 or 45, covering the entire long axis of the shaft 1 or 2 is illustrated. The blades 44,45, facing each other on the respective shafts 1, 2 have opposite helix angles. To allow close apposition of the blades 44,45 for efficient lateral transfer of materials, the turns 46 of each blade 44 alternate with the turns of the opposing blade 45. According to FIG. 7-10, as shafts 1 and 2 counter rotate in respective directions 8 and 10, the blades will move towards 46 each other and away from the left side 6 towards 47 the right side 7 of the machine. The continuous counter rotating motion of the opposing blades 44,45 will channel loose soil or granular materials to the space 48 between the blades 44,45 and then to the right side wall 7 inside the machine housing 3. Materials thus channelled there 7 is discharged outside of the housing 3 by a blower 49, 50, 52. Preferentially, the blower is rotatably mounted on the left side wall 7, behind shaft 1, and is driven to rotate either by shaft 1 or 2 through a belt 51 and pulley 52 system; A blower chute 53 in side wall 7 collects and channels the material to the blower 49,50,52 to be discharged outside 54; the vane members 50 on the blower fan 49,50 can be flat or helical in shape so as to generate maximal lift on material to be discharged. This helical auger blade configuration is well suited for the removal of loose granular materials such as soil, sand, fine gravel or snow.

Figure 8:
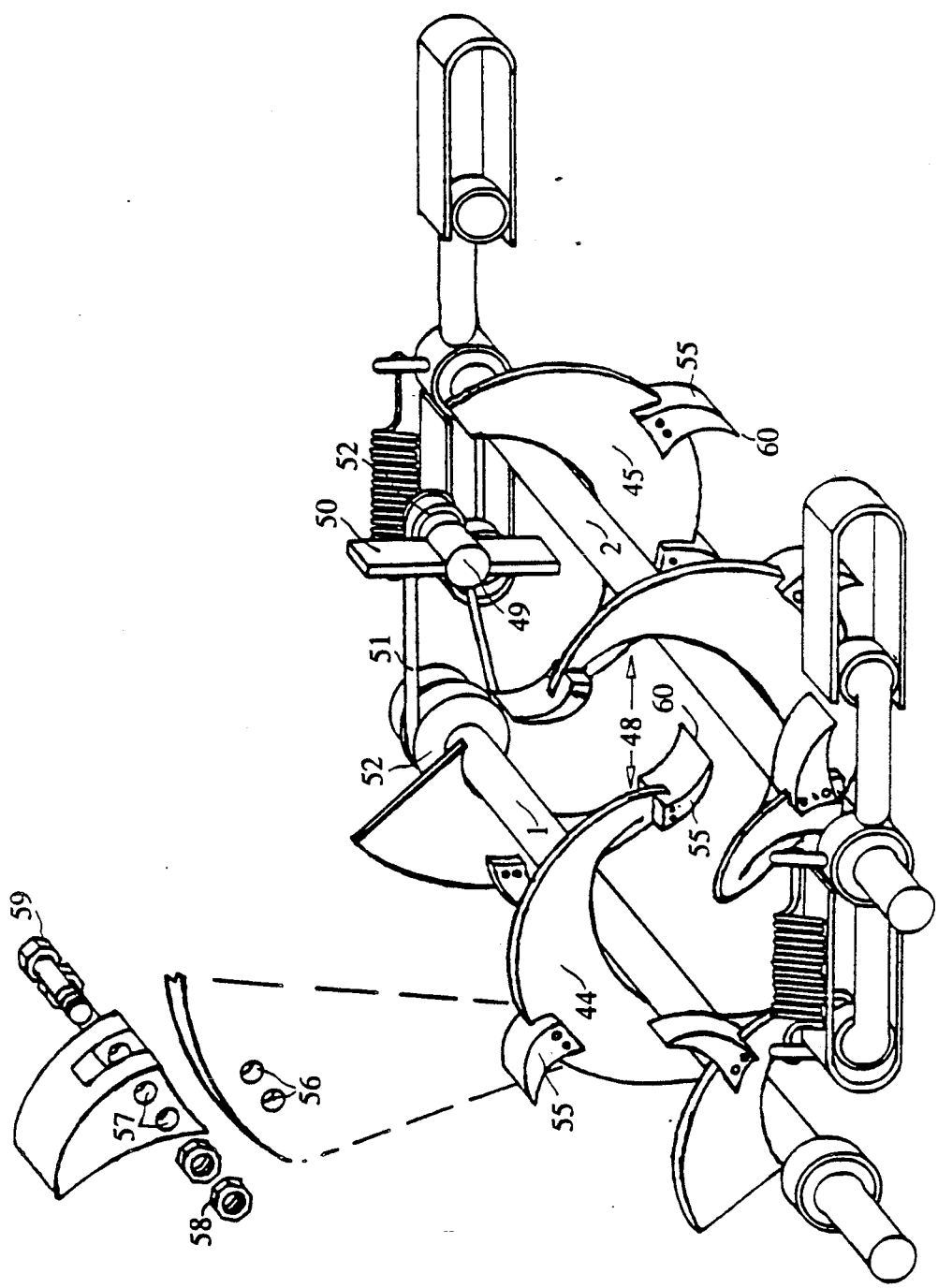
FIG. 8 is similar to FIG. 7 but additionally showing tilling/digging bits installed properly on the helical auger blades. The insert is an enlarged portion of a blade section with pre-determined holes through which the digging bits can be secured to the blade by a pair of bolts and nuts.
Figure 9:
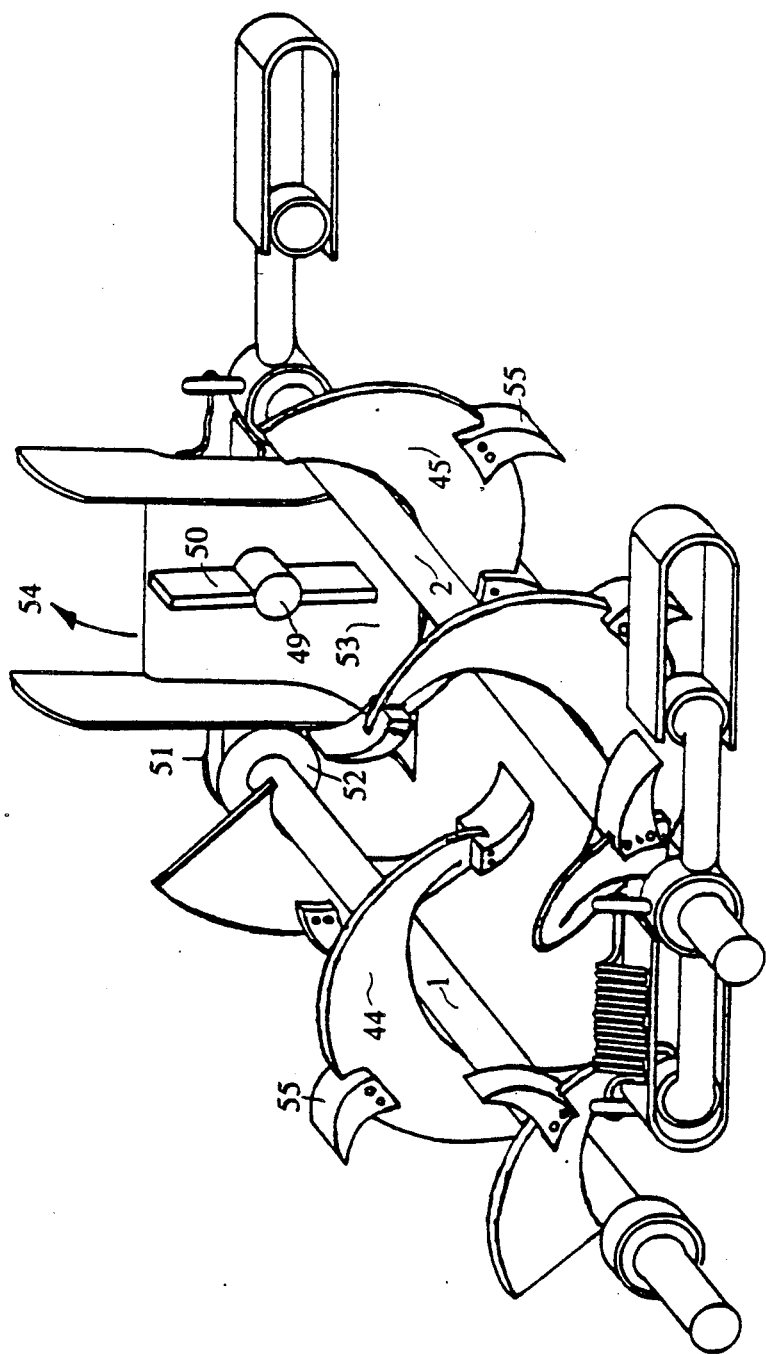
FIG. 9 is similar to FIG. 8 with the chute and fan blower also shown on the right of the machine.
Figure 10:
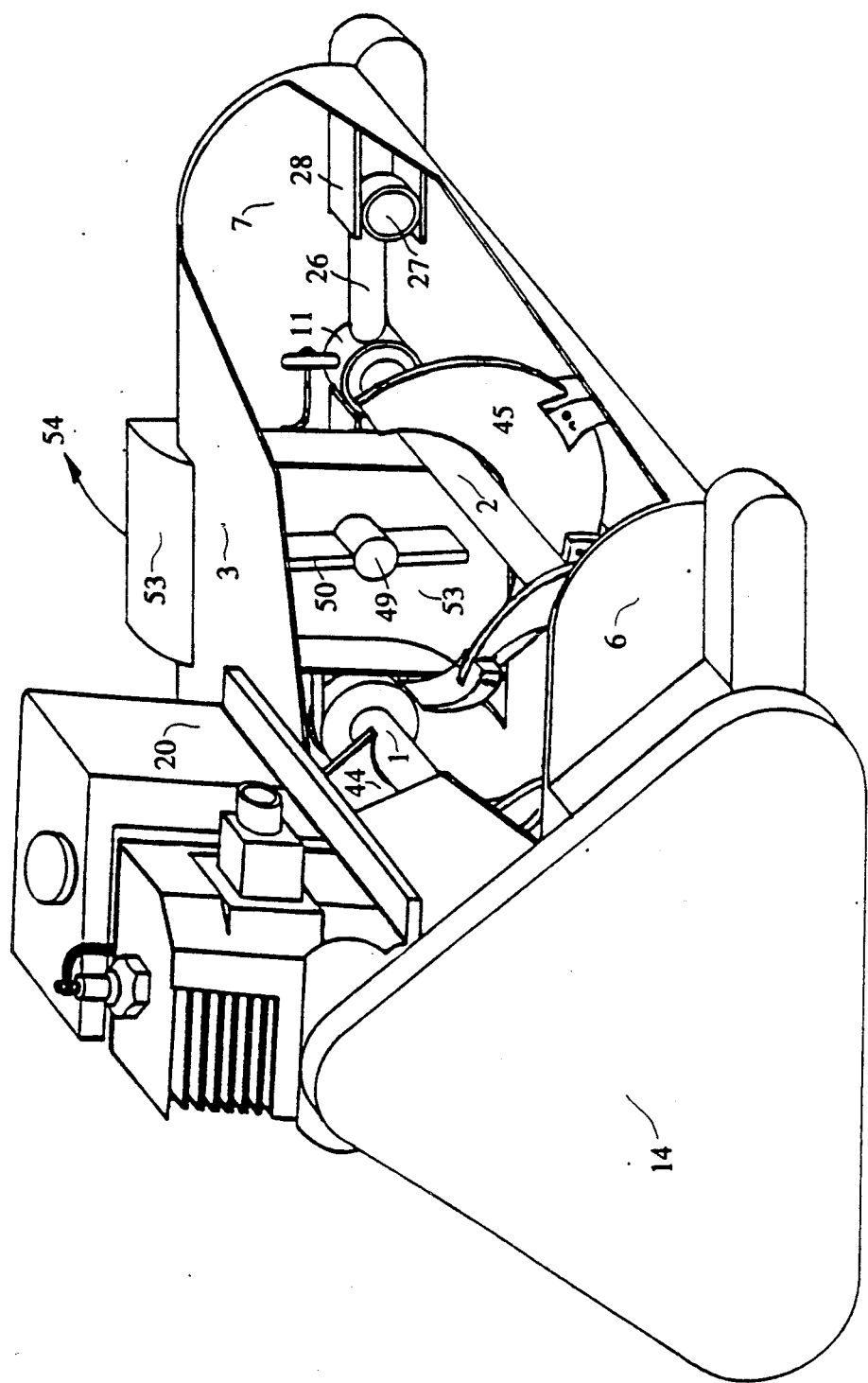
FIG. 10 shows the outside of the machine with cut-outs revealing the shafts, their helical augur blades, sliding track, chute and fan blower contained inside the housing.

If simultaneous soil tilling and removal is required, tilling bits 55 of suitable shape, size and number can be affixed to pre-determined positions 56 on the same blades 44 or 45 by nuts 58 and bolts 59 as shown in FIG. 8; the tilling bits 55 have forwardly directed hooks 60 pointing toward those on the opposite blade members 44 or 45. As blades 44,45 counter rotate, the tilling bits 55 will dig and till the soil loose and the loose soil will be channelled by the blades 44,45 at once to the right side wall 7 for example, where it is discharged to the outside 54 of the machine housing 3 by the blower 49,50.

Figure 11:
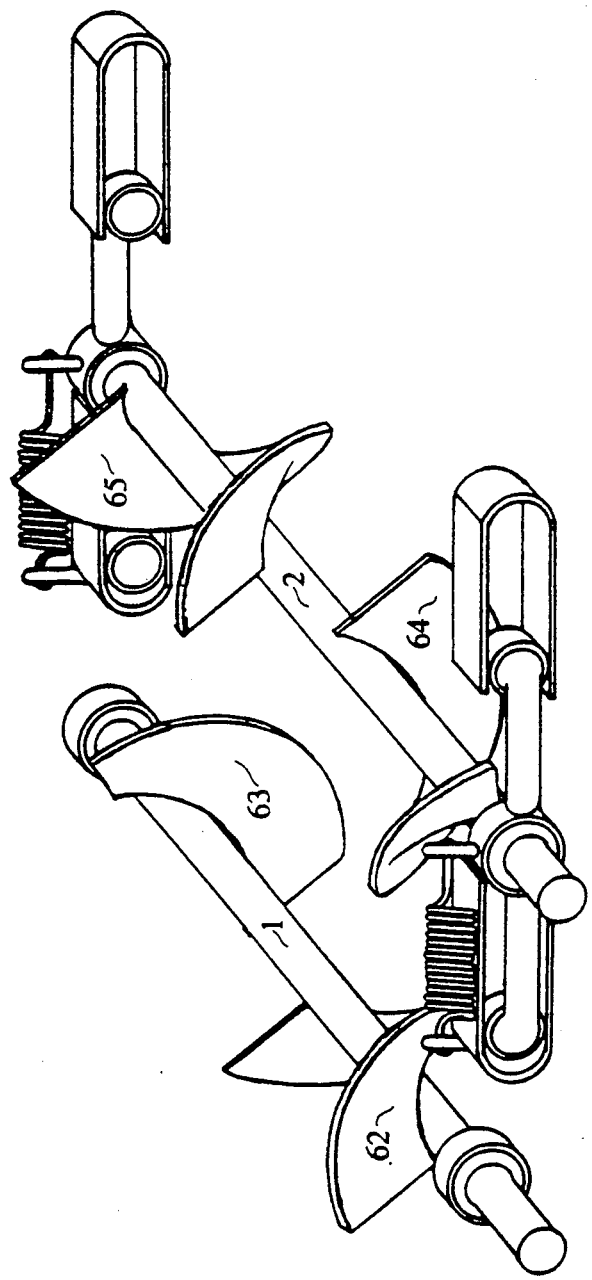
FIG. 11,12,13 showing the helical auger blades and their digging bits, chute and fan blower configured for discharge of materials from the center portion of the machine.
Figure 12:
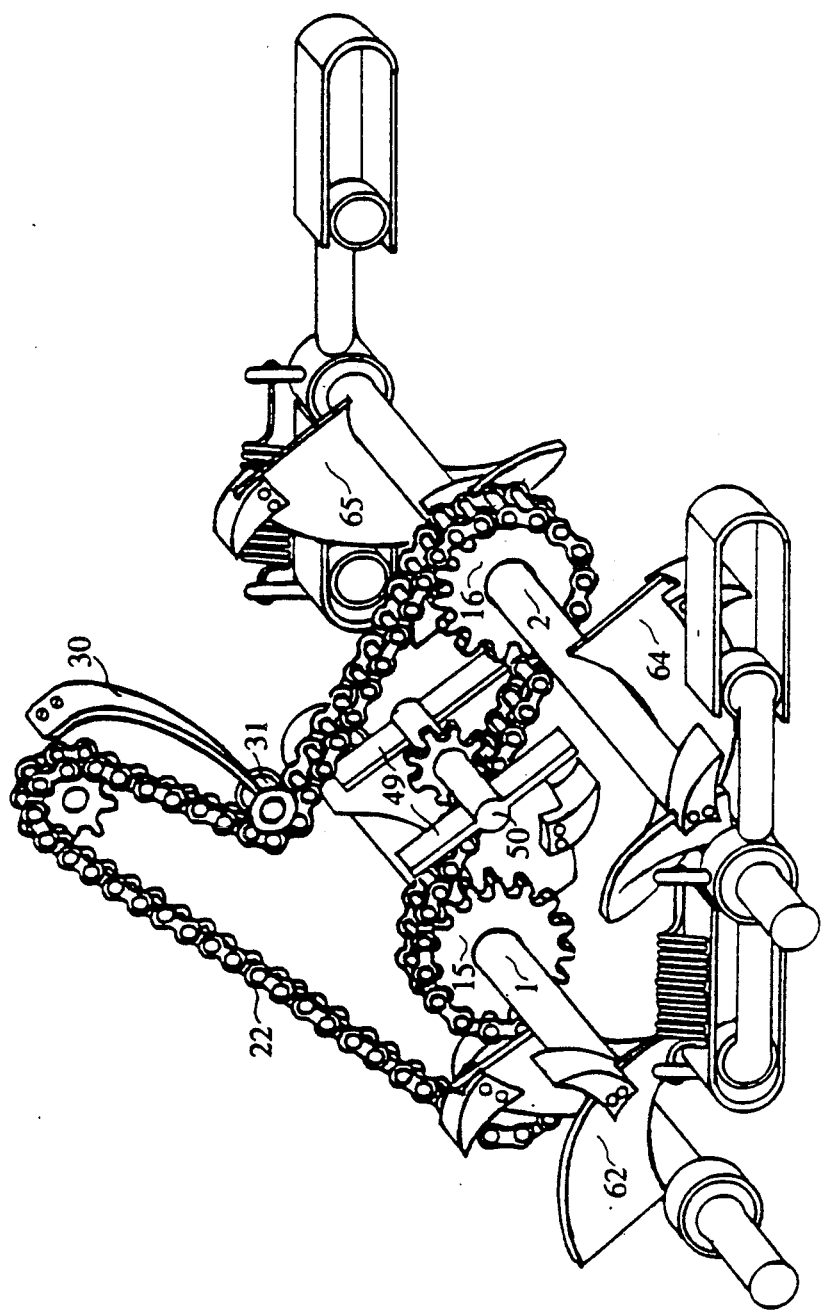
Figure 13:
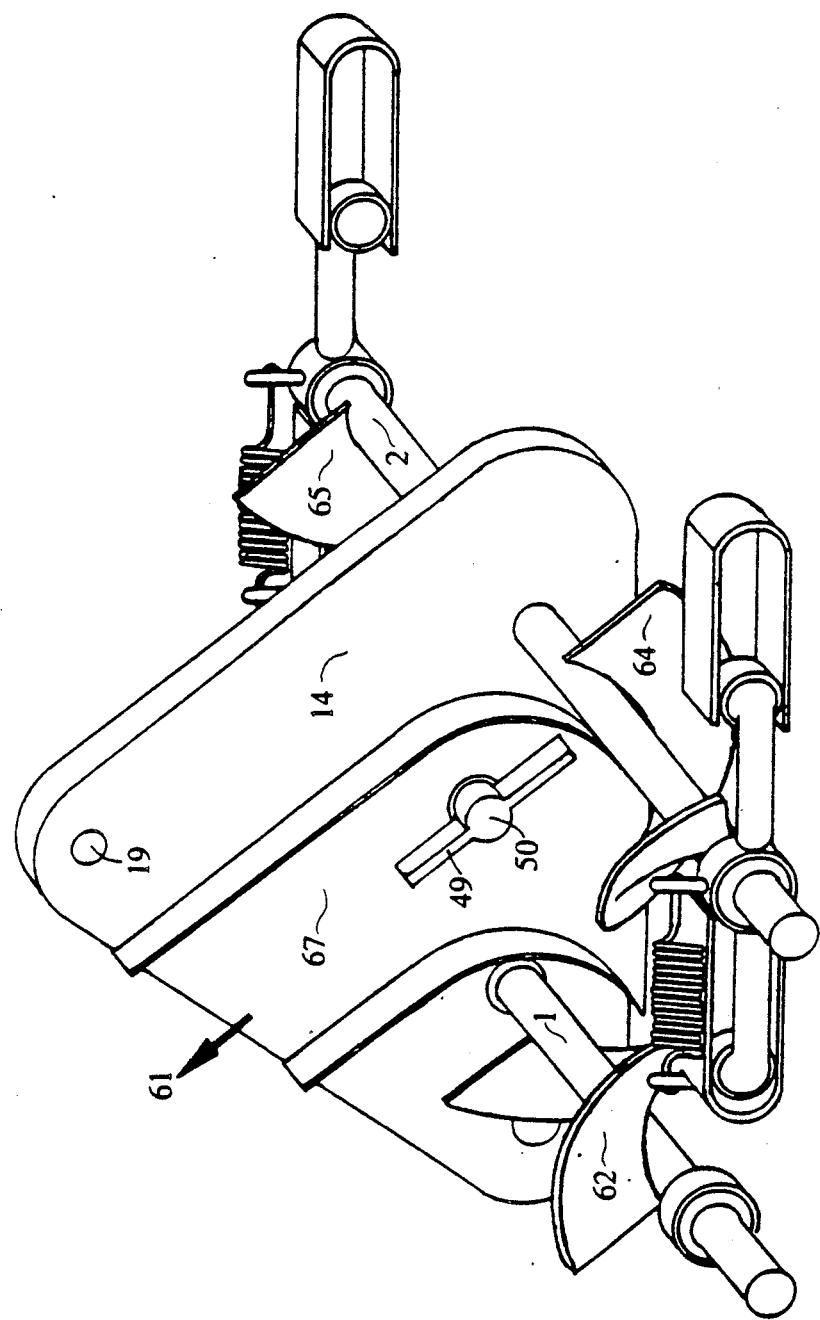

The machine configured in FIGS. 7 to 10 discharges material to one side 7 of the machine housing 3. FIG. 11 to 13 is the same machine but is configured to discharge materials from the center area 61 of the machine. This requires two helical auger blades 62, 63 each 62 having a reversed helical angle to the other 63 mounted on the same shaft 1, but on opposite sides of the centrally located transmission box 14. An identical set of blades 64,65 with opposite helix angles to those of 62, 63 are mounted similarly on shaft 2. As shafts 1, 2 counter rotates, the opposing blades 62, 63 and 64, 65 will move toward each other and toward the transmission box 14, Loose soil will then be channelled from both side walls 6,7 of the machine housing 3 towards the centrally located transmission box 14. Two blowers 49, 50, 66, each rotatably mounted on each side of the transmission box 14, discharge the soil materials through a chute 67 away from the machine in a manner similar to a conventional two stage snow blower. In this case, the blower can be driven to rotate through a small chain sprocket 66 by the same drive chain 22 inside the transmission box 14. As is in the case for the side discharge helical blade configuration, the central discharge helical blade configuration is suitable for snow or soil removal purposes; if tilling bits 55 are affixed to these blades 62, 63, 64, 65, simultaneous soil tilling and removal can be done.

Figure 14:
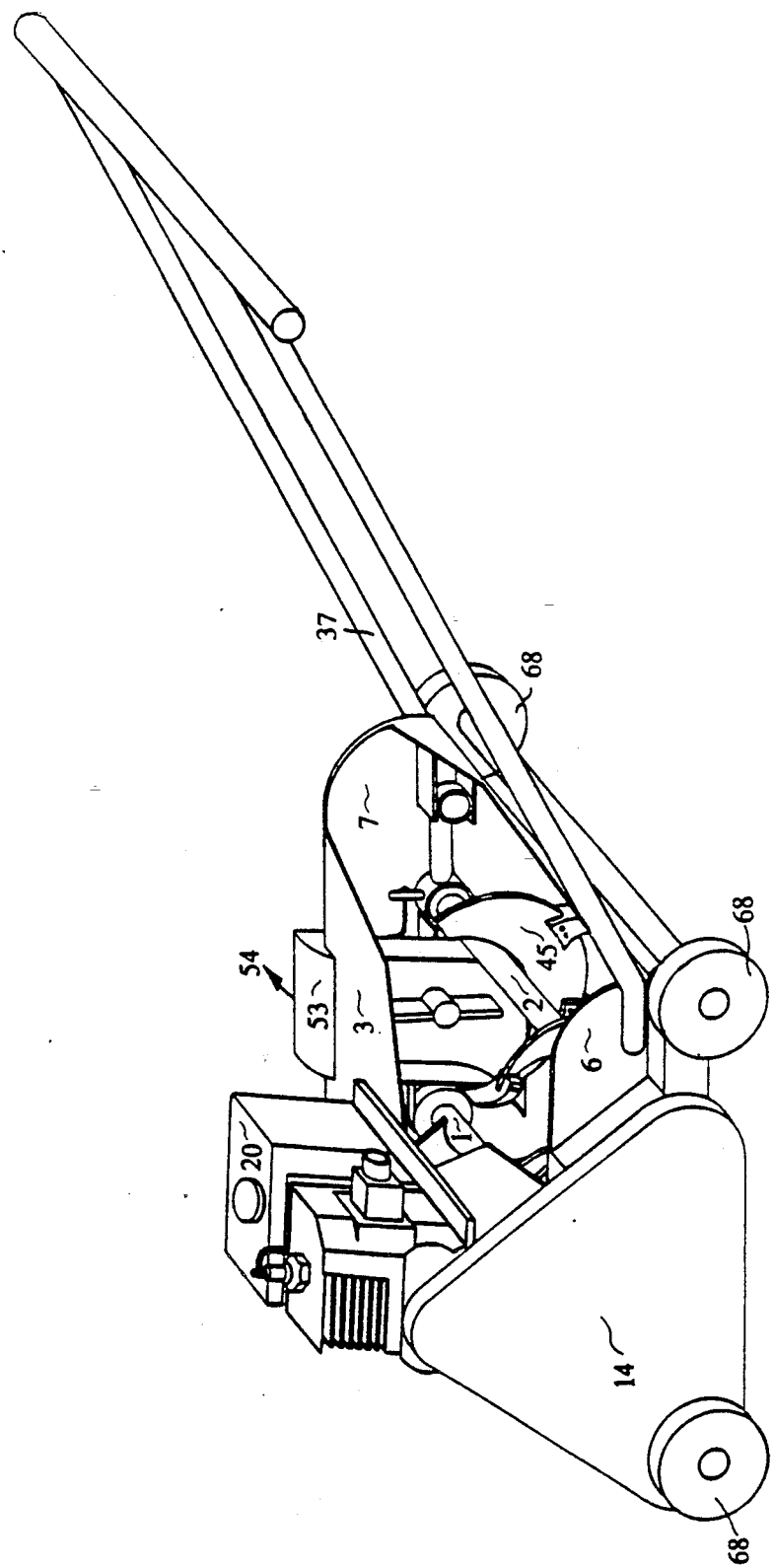
FIG. 14 shows the helical auger blade configuration contained inside the machine housing and with the handle properly installed. Retractable wheels are shown for support of the machine.

Finally, if tilling bits 55 are affixed to the counter rotating helical auger blade configuration, either the side discharge or central discharge version, the machine operates and moves in exactly the same way as the counter rotating tine 17,18 configuration; that is, stationary tilling, self-propelled forward or backward tilling and control of speed of machine travel are all controlled by the tilt of handle 37 (FIG. 14). On the other hand, if tilling bits 55 are not attached to the blades, then the machine travels on four wheels 68 with one mounted on each of the four corners of the machine housing 3 (FIG. 14). .

Therefore, unlike conventional machines, the counter rotating twin shaft system can perform a number of functions depending on the attachments affixed to the shafts; if conventional tines 17,18 are affixed to the shafts 1, 2, the machine resembles a conventional tiller but with much improved power and ease of machine movements required for efficient tilling of the ground (FIG. 1-6). If helical auger blades 44,45 or 62,63,64,65 with tilling bits 55 are installed instead on the same shaft 1,2, the machine can till and remove soil simultaneously (FIG. 8-10, 12-13). And if helical blades 44,45 or 62,63,64,65 are used without the tilling bits 55 (FIG. 7,11). the machine can travel on retractable wheels 68 for snow removal purposes (FIG. 14).

What is claimed:

1. A rotor tiller comprising:
   a housing;
   an engine;
   guide means attached to said housing for guiding said tiller and for controlling the forward and rearward movements and speed of travel of said tiller;
   two shafts having digging or transporting means affixed thereto are rotatably mounted on said housing, one of said shafts mounted parallel and forward of the other shaft;
   a transmission box for driving each of said shafts in a manner that a counter rotation is created between each of said shafts;
   sliding tracks mounted on said housing for receiving one of said shafts, said shaft is rotatably and slidably held within said track;
   spring means for holding said shaft located in said track at a predetermined distance from the said other shaft whereby a force applied against said shaft causes it to slide in said track in response to said force such that the distance between said shafts is increased and upon release of said force said shaft is returned to said predetermined distance from said other shaft by said spring means.

2. A rotor tiller comprising:
   a housing;
   an engine mounted on said housing;
   a pair of depending sidewalls from said housing;
   guide handles attached to said housing for guiding said tiller and for controlling the forward and rearward movements and speed of travel of said tiller;
   two shafts having digging or transporting means affixed thereto are rotatably mounted on said side walls, one of said shafts mounted parallel, forward and in the same horizontal plane as the other shaft;
   a transmission box located on a sidewall such that each of said shafts extends through said side wall and terminates into a shaft sprocket located in a portion of said transmission box;
   an engine drive shaft extending from said engine into said transmission box and terminating in a drive sprocket;
   a drive chain interconnecting said drive sprocket with said shaft sprockets creating a counter rotation between each of said shafts;
   a sliding track mounted on each of said sidewalls for receiving one of said shafts, said shaft is rotatably and slidably held within said track in a horizontal plane;
   spring means for holding said shaft located in said track at a predetermined distance from the said other shaft whereby a force applied against said shaft causes it to slide in said track in response to said force such that the distance between said shafts is increased and upon release of said force said shaft is returned to said predetermined distance from said other shaft by said spring means.

3. The rotor tiller of claim 2 wherein said digging or transporting means includes tines, paddles or blades.

4. The rotor tiller of claim 2 wherein said digging or transporting means includes at least one helical auger blade with removable digging bits affixed thereto to dig and transport soil/material.

5. The rotor tiller of claim 4 wherein said digging bits dig and transport soil/material and said soil/material will be channelled by said helical auger blades to a space between said shafts and then transported laterally.

6. The rotor tiller of claim 5 which additionally includes a chute for collection of said transported soil/material to a discharge means.

7. The rotor tiller of claim 6 wherein said discharge means includes a fan blower.

8. The rotor tiller of claim 4 wherein said helical auger blades functions for snow removal purposes.

9. The rotor tiller of claim 8 wherein said snow will be channelled by said helical auger blades to said space between said shafts and then transported laterally.

10. The rotor tiller of claim 7 which additionally includes a chute for collection of said snow to a discharge means.

11. The rotor tiller of claim 10 wherein said discharge means includes a fan blower.

12. The rotor tiller of claim 2 wherein said tiller includes wheels supporting said housing.

* * * * *